Nov. 12, 1968     M. E. STANLEY     3,410,691
EDIBLE FOOD ARTICLE AND PROCESS OF PREPARING
Filed July 26, 1966     2 Sheets-Sheet 1
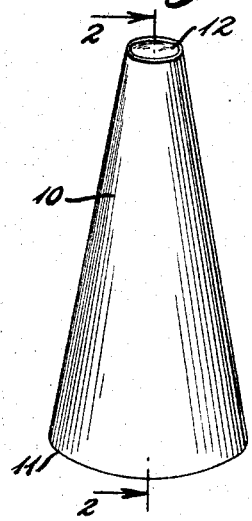
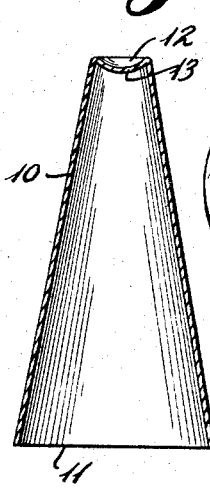
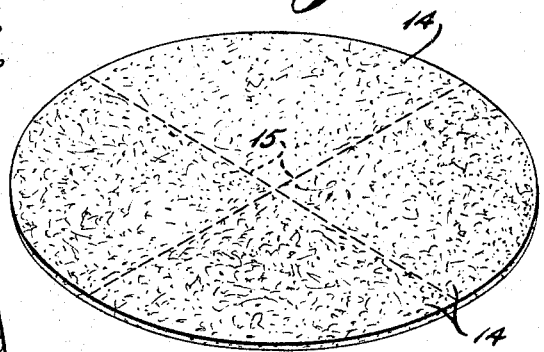
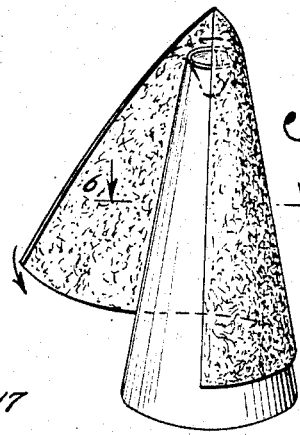
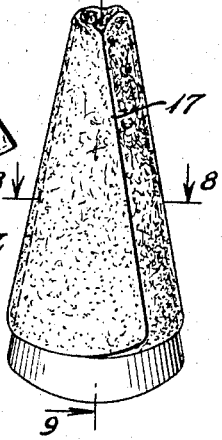
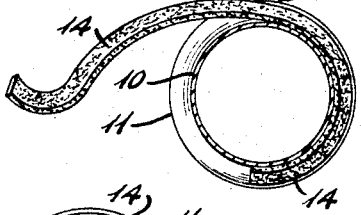
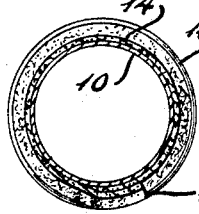
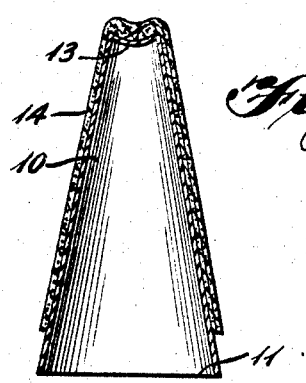
INVENTOR
MARY E. STANLEY
BY *Yates Dowell & Yates Dowell*
ATTORNEYS

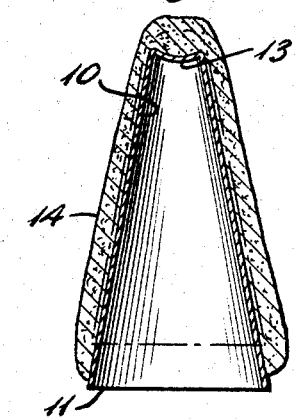
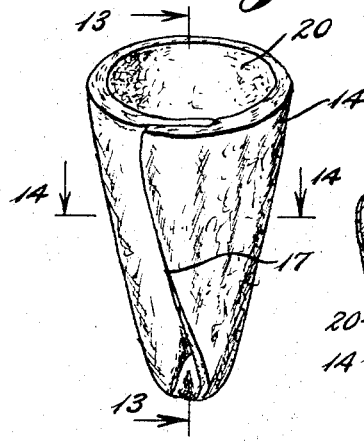
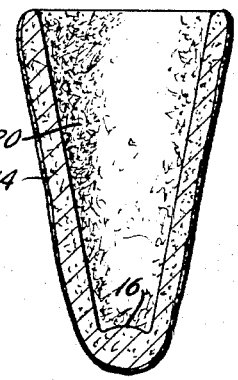
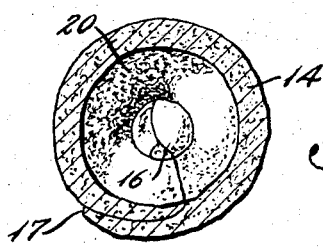
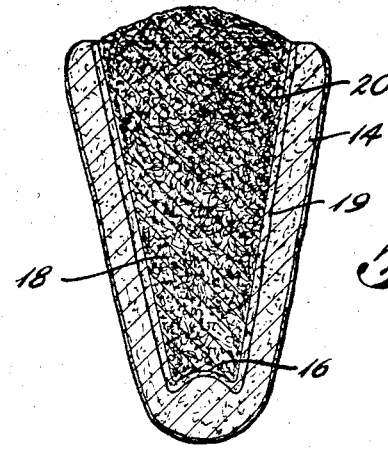
INVENTOR
MARY E. STANLEY United States Patent Office 3,410,691
Patented Nov. 12, 1968

3,410,691
EDIBLE FOOD ARTICLE AND PROCESS
OF PREPARING
Mary E. Stanley, 424 Bryan St.,
Rockingham, N.C. 28379
Continuation-in-part of application Ser. No. 324,755,
Nov. 19, 1963. This application July 26, 1966, Ser.
No. 568,020
5 Claims. (Cl. 99—88)

ABSTRACT OF THE DISCLOSURE

Preparation of a yeast-raised bakery product by applying a sheet of dough to a conical mold, sealing the tapered end portion of the dough, applying a browning glaze thereto and baking the product.

---

This application is a continuation-in-part of my application Ser. No. 324,755 filed Nov. 19, 1963 for Food Products which has been allowed to lapse in view of the fact that the subject matter is covered in the present application.

This invention relates to foods, especially of the farinaceous variety, regardless of whether consumed as the staff of life or to supplement other foods, and whether eaten either independently or as a carrier or holder for other comestibles, as well as to an esthetic, particularly attractive, highly palatable, finished food article of excellent texture and delectable taste characteristics.

It is an object of the invention to provide a baked yeast-raised, edible food article and process of making the same, which food article is of an esthetic character, pleasing to the eye, capable of passing the most severe tests relative to nutriment, digestibility, caloric content, and the like, and of maximum attractiveness and desirability to the consumer, as well as an article which can be eaten readily by young and old alike with maximum satisfaction on account of its taste, palatability, complete nutriment, and maximum digestibility with minimum weight-producing characteristics.

Another object of the invention is to provide a food article and process of making the same, which food article is of a size and configuration to be comfortably and conveniently held in the hand, with or without a filling or partial filling of granular food, such as chicken, ham, beef, seafood or the like, and with or without supplements, such as rice, chopped onions, minced pickles, spaghetti, cheese, slaw, or other substance, and for consumption in small or large amounts.

A further object of the invention is to provide a baked, yeast-raised food article and process for making the same, having a slight external taper with its larger end open and its smaller end closed and with a relatively thick wall defining an internal cavity of predetermined size and capacity, the texture of the article being relatively light and soft with a thin surface skin or crust beautifully browned and with or without a fold line along its length and with the smaller closed end reinforced by an inwardly rounded portion.

A further object of the invention is to provide a process of making an edible food article using a yeast-raised dough supported solely internally by a mold while being baked.

Other objects and advantages of the invention will be apparent from the following description considered in connection with the accompanying drawings wherein:

FIG. 1 is a perspective of a generally conical form or mold used in the manufacture of the invention;

FIG. 2, a longitudinal section on the line 2—2 through the longitudinal center of the same;

FIG. 3, a flattened mass of yeast-containing dough prior to its being cut into four parts;

FIG. 4, an exploded view illustrating one of the pie-shaped dough sectors of FIG. 3 about to be spirally applied to a mold;

FIG. 5, a perspective illustrating the next step after that of FIG. 4 in the application of the dough to the mold;

FIG. 6, a further similar step on the line 6—6 of FIG. 5;

FIG. 7, a perspective of the dough after it is wrapped upon the mold;

FIG. 8, a horizontal section on the line 8—8 of FIG. 7;

FIG. 9, a longitudinal section on the line 9—9 of FIG. 7;

FIG. 10, a section similar to FIG. 9 after the dough has had time to raise, but before baking;

FIG. 11, an exploded view of one of the articles separated from the mold after baking;

FIG. 12, an inverted perspective of one of the articles after baking;

FIG. 13, a longitudinal section approximately on the line 13—13 of FIG. 12;

FIG. 14, a horizontal section of one of the articles slightly enlarged and substantially on the line 14—14 of FIG. 12; and, FIG. 15, a longitudinal section of the article with a filler of precooked or otherwise prepared granular material in which the thickness of the side wall is exaggerated to illustrate the swelling of the dough due to moisture absorption.

Briefly stated the present invention is a baked, yeast-raised food article which can be eaten separately or can be used as a holder readily held in the hand and consumed with its contents and with a minimum of attention, and without crumbs, waster or spillage. The invention is of light, soft texture, of low caloric content, containing a nutriment but a minimum of fat, and with a relatively thick wall about a central cavity and a thin surface skin or crust, beautifully browned and attractive in appearance, highly palatable, with a slightly tapered body and a thickened rounded and internally reinforced smaller end.

With continued reference to the drawings, the edible food article which comprises the present invention may also be used as a container or holder for food. It may be produced in quantities on forms or molds 10 which taper slightly from an enlarged base 11 to an apex 12 and with the surface of the dough preferably coated with a glazing and browning substance containing milk and eggs to form a thin skin or crust on the outside of the container or holder when baked. The mold may be of relatively thin metal and may have its smaller end provided with an internally rounded or recessed portion 13 to produce in the baked product a thickened raised interior rounded end reinforcement and to distribute the moisture to a large area around the bottom of the inner wall.

In FIG. 3 is illustrated a yeast-contained flat disk or circular shaped sheet of bread dough 14 preferably with division lines 15 indicating how the dough may be cut to provide individual sectors, four of which are illustrated and each of which is to be adapted to be wrapped spirally around the mold 10. The radius of the sheet of dough 14 is near the axial length of the mold 10 and when wrapped around the mold, the rounded edge of the sector of dough is spaced slightly above the base of the mold to allow for yeast-caused expansion before and during baking. Also this space around the lower edge of the spirally wound dough sector permits heat to pass freely and completely around the mold and in contact with the lower edge of the dough to insure thorough cooking of the same.

When the dough sector is spirally wrapped around the mold, it extends slightly over and beyond the smaller end of the mold. As the wrapping of the dough is being completed, the tip of the dough is tucked in under an adjacent portion and pressed against portion 13 of the mold so that upon removal of the mold, a rounded mound 16 is formed which serves to thicken and reinforce the food product. After the dough is applied to the mold, a suitable glazing preparation is applied which also causes the beautiful browning of the exterior of the surface with the interior unbrowned, such exterior having a relatively thin crust but with a shoulder fold line 17 extending lengthwise of the article. The shoulder fold line 17 facilitates the gripping and holding of the article in the hand.

The mold with the dough thereon is placed in an oven and baked with the dough supported solely by the mold and unconfined otherwise so that it is free to expand outwardly in all directions and thus produce a relatively thick side wall of substantially uniform width.

The farinaceous bread article above described may be eaten independently, or if desired it may be provided with a filling 18 of any desired character, such as granular meaty substance with or without relish, chopped onions, cole slaw, and with or without a topping and thoroughly mixed or stratified. This filling may contain moisture and when placed in the article 14 the moisture will penetrate the interior wall of the article to a depth as indicated at 19 in FIG. 15. This, however, will not materially interfere with the volume contained in the cavity 20 which is approximately one-half the volume of the container, thus providing a favorable balance between the farinaceous and meaty or other components of the article. Also the moisture is evenly distributed over the length of the article and will not penetrate the outer wall so as to drip onto the person holding same.

The invention consists essentially of a food article comprising a relatively thick side wall enclosing a central cavity, said side wall being made of baked yeast-raised bread dough and tapering from a large open end to a small end closed by a rounded and tucked in bottom wall, the outer surface of said food article having a thin surface crust beautifully browned and attractive in appearance with a shouldered fold line extending lengthwise thereof.

It will be obvious to one skilled in the art that various changes may be made in the invention without departing from the spirit and scope thereof and therefore the invention is not limited by that which is illustrated in the drawings and described in the specification, but only as indicated in the accompanyng claims.

What is claimed is:

1. A process of making an edible food article comprising the steps of forming a flat sheet of yeast-containing dough into a sector shape, spirally wrapping said sheet around a hollow conical mold with the rounded portion of said sector adjacent to the larger end of said mold and with the apex of said sector extending over and beyond the smaller end of said mold, pressing the apex portion of said dough sector toward and against the smaller end of said mold to form a bottom wall provided with an inwardly rounded reinforcing portion at its center, applying a glazing and browning preparation to the exterior of the dough applied to the mold, baking the dough in an oven with the dough supported solely by the mold and unconfined otherwise so that it is free to expand outwardly in all directions and thus produce a relatively thick side wall having a smooth inner surface, an uneven irregular browned outer crust surface provided with a shouldered fold line extending lengthwise thereof; and with the interior of said side wall having a soft bread texture, and removing the baked, edible article from the mold.

2. A process of making an edible food article comprising the steps of forming a flat sheet of yeast-containing dough, spirally wrapping said sheet around a hollow conical mold, pressing the apex portion of said dough toward and against the smaller end of said mold to form a bottom wall provided with an inwardly rounded reinforcing portion at its center, applying a glazing and browning preparation to the exterior of the dough applied to the mold, baking the dough in an oven with the dough supported solely by the mold and unconfined otherwise so that it is free to expand outwardly in all directions and thus produce a relatively thick side wall having a smooth inner surface, an uneven irregular browned outer crust surface, and a shouldered fold line extending lengthwise thereof, and with the interior of said side wall having a soft bread texture, and removing the baked edible article from the mold.

3. A process of preparing a yeast raised, baked, surface glazed, generally cone shaped, edible food holder comprising the steps of producing a yeast contained dough, forming said dough into a substantially flat, relatively thick, rounded sheet, subdividing said sheet into sectors, spirally wrapping one of the sectors of the dough around the exterior of a mold of relatively thin metal having a taper between its ends and with its larger end open and providing a relatively thick dough wall with the rounded portion of the sector adjacent the larger end of the mold, extending the dough of said last mentioned sector beneath the smaller end of the mold to provide an area of thickness greater than that of said dough wall, applying a glazing and browning preparation to the exterior of the sector of dough, baking the dough on the mold for a period of time to form a thin brown crust on its exterior while the remainder of the article retains a relatively soft consistency, and removing the baked article from the mold.

4. The process of making an edible food article comprising the steps of applying a yeast-containing dough to hollow substantially conical mold means to provide a generally conical hollow product, pressing the apex portion of said dough toward and against the smaller end of said mold means to form a bottom wall provided with an inwardly rounded reinforcing portion adjacent the center thereof, applying a glazing and browning preparation to the dough, baking the dough in an oven with the dough supported solely by the mold and unconfined otherwise to produce a relatively thick side wall having a substantially smooth inner surface, thereby producing a relatively thick-walled article having a soft bread texture with a browned outer surface.

5. An edible food product produced by the process of claim 4.

References Cited

UNITED STATES PATENTS

| 754,549 | 3/1904 | Dietz. | |
| 1,015,400 | 1/1912 | Renaud | 99—89 |
| 1,509,194 | 9/1924 | Dresser | 99—88 |
| 1,915,210 | 6/1933 | Balton | 99—89 |
| 2,585,000 | 2/1952 | Friddell. | |
| 3,086,484 | 4/1963 | Ibex | 99—88 X |
| 3,088,829 | 5/1963 | Rapaport | 99—86 X |
| 3,157,134 | 11/1964 | Heyman | 99—89 X |
| 3,290,134 | 12/1966 | Turner | 99—88 |

RAYMOND N. JONES, *Primary Examiner.*